United States Patent [19]
House et al.

[11] 3,782,409
[45] Jan. 1, 1974

[54] LINE TAKE-UP ASSEMBLY

[75] Inventors: Marshall K. House; Michael D. Train, both of Portland, Oreg.

[73] Assignee: Cascade Corporation, Portland, Oreg.

[22] Filed: Mar. 31, 1972

[21] Appl. No.: 240,101

[52] U.S. Cl.................. 137/355.17, 267/10, 267/61
[51] Int. Cl............................................. B65h 75/36
[58] Field of Search................. 137/355.12, 355.16, 137/355.17, 355.23, 355.26, 355.28; 267/10, 17, 58, 61

[56] References Cited
UNITED STATES PATENTS

| | | | |
|---|---|---|---|
| 3,552,425 | 1/1971 | Olson | 137/355.17 |
| 1,889,796 | 12/1932 | Snyder | 267/10 |
| 1,849,709 | 3/1932 | Foster | 267/10 |
| 1,881,764 | 10/1932 | Ludwig | 137/355.26 |
| 1,914,654 | 6/1933 | Tornblom | 137/355.17 |
| 2,629,630 | 2/1953 | Roark | 137/355.23 X |
| 2,823,074 | 2/1958 | Bernard, Jr. | 137/355.26 X |
| 3,437,105 | 4/1969 | Stracek | 137/355.23 |
| 3,493,009 | 2/1970 | Richardson | 137/355.17 |
| 3,534,766 | 10/1970 | Barto | 137/355.17 X |
| 3,662,777 | 5/1972 | Plunkett et al. | 137/355.17 |

*Primary Examiner*—Samuel Scott
*Attorney*—John W. Stuart

[57] ABSTRACT

A take-up assembly for hydraulic hose. The assembly includes a rotary fluid coupling formed by a journal member and a hose connector which is rotatably mounted on the journal member--these two parts including intercommunicating fluid passages. The hose connector has flange which mounts other parts in the assembly that collectively form a hose-storing reel. These other parts contain cutaways which both axially and radially expose for access that portion of the hose connector to which a hose end may be attached.

A take-up string in the assembly acts between the journal member and the reel, and features a nonangular inner end which is releasably locked to the shaft through mechanism that releases such end to prevent back-winding damage to the spring.

16 Claims, 6 Drawing Figures

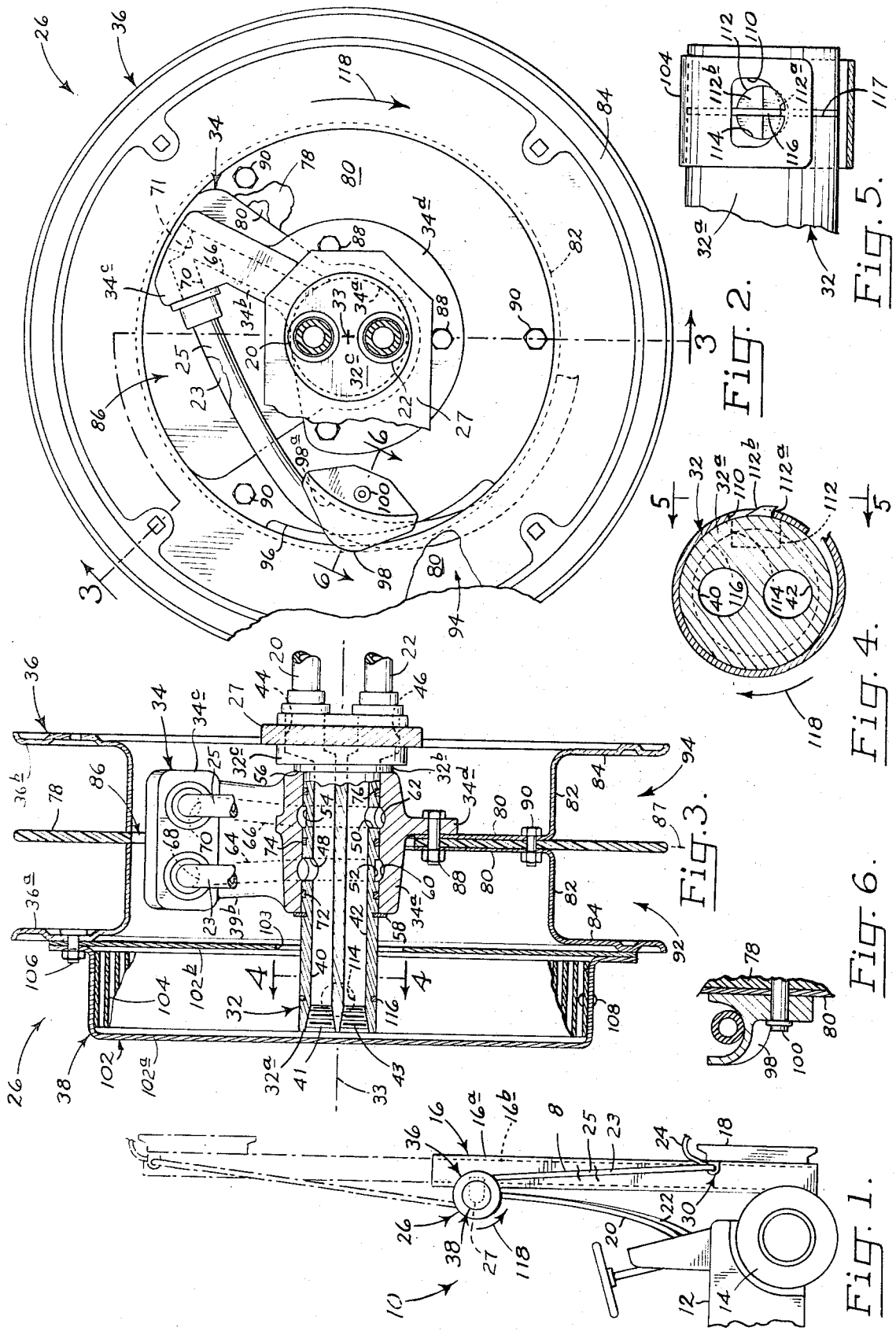

LINE TAKE-UP ASSEMBLY

BACKGROUND AND SUMMARY OF THE INVENTION

This invention pertains to apparatus for taking up and paying out flexible line, such as flexible hydraulic hose. For the purpose of illustration herein, a preferred embodiment of the invention is described as employed in an industrial lift truck, to take up and pay out hydraulic hose.

The usual lift truck includes a vertically disposed telescopic mast assembly, including an outer stationary mast section, and at least one inner mast section mounted on and vertically extensible relative to the outer mast section. A carriage is mounted for vertical movement on the inner mast section, adapted to carry various kinds of power-operated equipment, such as a side-shifter, clamping arms, a vacuum grab, etc. Ordinarily such equipment is operated hydraulically.

Fluid power for operating such equipment commonly is supplied through flexible hoses that extend from a truck's hydraulic system, and through a spring-biased hose take-up unit (mounted near the top of the stationary mast section), to the carriage. The take-up unit accommodates movement of the carriage, and maintains tautness in hose reaches which extend from the unit toward the carriage.

For the most satisfactory performance, such a unit must be durable, and should be easy to service when service is necessary. Further, it should be constructed in such a manner that hose attachments to it can readily be made, preferably without requiring special tools or skills, and without requiring any disassembly of the unit.

A general object of the present invention, therefore, is to provide a novel take-up assembly for flexible line, such as for flexible hydraulic hose, which takes these considerations into account in a satisfactory and practical manner.

More particularly, an object of the invention is to provide such an assembly, wherein hose connections can readily and quickly be made, with little skill required, and without the need for removal of any parts in the assembly.

Another object of the invention is to provide such an assembly which affords easy access to seals therein for inspection or replacement, or other purposes.

A further object of the invention is to provide an assembly of the type outlined, wherein a biasing spring is employed, with such mounted in a manner greatly minimizing the chance of its becoming overstressed, and thereby damaged.

Still another object of the invention is to provide such an assembly which attains the various features and advantages just discussed with a relatively simple and inexpensive construction.

Thus, and according to a preferred embodiment of the invention, a take-up assembly is proposed, wherein a central journal member containing fluid passages rotatably supports a line or hose connector which also contains fluid passages—these two parts combining to form a rotary fluid coupling in the assembly. Featured in the line connector is a radially extending flange which affords a mounting for reel parts in the assembly—such reel parts forming a pair of outer, annular line-receiving channels for collecting line in windings. The reel parts proposed include a pair of outer reel sections having mirror-image configurations, and a divider between these sections. The two sections and the divider are secured to the flange just mentioned, and include axially matching openings which afford clearance for an access to that portion of the line connector to which an end of a line may be attached. Openings are also provided in the reel sections for enabling the extension of line between the line connector and the line-receiving channels.

A coil biasing spring is provided in the assembly, which, according to the invention, has an opening in its inner end through which a notched projection is a catch carried on the journal member extends to grasp this inner end. The inner end of the spring has a smoothly curving, rather than an angular, configuration, which configuration extends substantially tangentially with respect to the outside of the journal member. A cam surface formed on the projection in the catch enables recapturable releasing of the inner end of the spring under circumstances of excessive back-winding in the assembly.

Such construction results in a simple assembly, having relatively few parts which can easily be fabricated to accommodate different particular sizes and types of line. With central openings formed in the reel parts, ready access is provided for attaching a hose end to the line conductor. Such access is provided without the need for removing any parts in the assembly.

Another important consequence of the proposed construction is that the likelihood of spring failure is greatly minimized. This is because the construction and mounting contemplated for the spring's inner end minimizes stresses at this point. For example, with such inner end lacking angularity (i.e., sharp bending as is found in many prior art constructions), spring tension is quite uniformly distributed in the spring's material adjacent such end. Sharp bend constitute potential failure points. Further, the fact that the catch mentioned is releasably caught with this inner end (to prevent damage from excessive back-winding), further minimizes the likelihood of destructive spring damage.

DESCRIPTION OF THE DRAWINGS

These and other objects and advantages attained by the invention will become more fully apparent as the description which follows is read in conjunction with the accompanying drawings, wherein:

FIG. 1 is a simplified side elevation, illustrating portions of the front of a lift truck which is equipped with a line take-up assembly constructed according to the invention;

FIG. 2 is an enlarged fragmentary side elevation, illustrating details of the take-up assembly of FIG. 1 as viewed from the opposite side of the truck in FIG. 1;

FIG. 3 is a cross-sectional view taken generally along the line 3—3 in FIG. 2;

FIG. 4 is an enlarged cross-sectional view taken generally along the line 4—4 in FIG. 3;

FIG. 5 is a view taken along the line 5—5 in FIG. 4; and

FIG. 6 is a view taken generally along the line 6—6 in FIG. 2.

DETAILED DESCRIPTION OF THE INVENTION

Turning now to the drawings, and referring first to FIG. 1, indicated generally at 10 is the front of a lift truck having the usual truck frame 12 and front wheel assemblies, such as assembly 14, supporting the forward end of the frame for movement over the ground.

Mounted on the front of frame 12 is a generally vertically disposed telescopic mast structure 16. The mast structure comprises an outer stationary mast section 16a, which nestably receives an inner vertically shiftable mast section 16b. Although the outer mast section is referred to herein as being stationary, to bring out the fact that it does not shift vertically, it should be understood that this section may be, and ordinarily is, mounted on the truck frame through a pivot connection enabling limited forward and rearward tilting of the section.

A carriage 18 is shown disposed forwardly of the mast structure, which carriage is mounted for vertical movement on the inner mast section. In the usual industrial application, power-operated equipment, as for example a pair of hydraulically actuated clamping arms, might be mounted on the carriage for clamping onto loads transported by the lift truck. Since the particular type of such equipment utilized forms no part of the invention, and in order to simplify the drawings, this equipment has been omitted from the drawings.

In truck 10, carriage 18 is shifted up and down on the inner mast section, and the inner mast section is moved up and down on the outer mast section, by operation of a conventional hydraulic hoist ram (concealed). With such an arrangement, the vertical position of the carriage, and any equipment which it carries, can be adjusted infinitely between certain upper and lower limits. For example, in solid outline in FIG. 1, the carriage is shown at its lowermost position in the truck. In dash-dot outline in the figure, the carriage and inner mast section are shown elevated somewhat.

Hydraulic fluid for operating the equipment on the carriage is supplied and exhausted through flexible hoses shown partially at 20, 22, which are suitably connected to the usual hydraulic system on the truck. Hoses 20, 22 extend to a hose, or line, take-up assembly 26 through which fluid connections are established to hoses 23, 25, respectively, which then extend toward the carriage. Assembly 26 is constructed according to the invention, and is mounted through a bracket 27 adjacent the top and toward the near side in FIG. 1 of outer mast section 16a. Inner end portions of hoses 23, 25 are stored as windings in the take-up assembly. The outer ends of hoses 23, 25 connect through a conventional line coupler 30 with jumper hoses, such as hose 24, which extend toward and connect with the power-operated equipment on the carriage.

Referring now to FIGS. 2 and 3, these two figures illustrate in detail the construction contemplated for assembly 26. This assembly contains, basically, four components: a journal member 32, a hose, or line, connector 34; a reel, or line-storing means, 36; and a spring assembly 38.

Journal member 32 is cylindrical, and includes an elongated end portion 32a having one outside diameter which joins through a midportion 32b of slightly larger outside diameter with another end portion 32c having an even larger outside diameter. Extending axially into the journal member, from the left end thereof in FIG. 3, are elongated spaced-apart bores 40, 42. The left ends of bores 40, 42 in FIG. 3 are closed off by plugs 41, 43, respectively. The right ends of bores 40, 42 join with offset, axially extending bores 44, 46, respectively, which open to the right end of member 32 in FIG. 3.

In addition, bores 40, 42 communicate through axially spaced, radially extending bores 48, 50, respectively, with axially spaced circumferential grooves 52, 54, respectively, formed on the outside of end portion 32a in the journal member. Previously mentioned hydraulic hoses 20, 22 connect through suitable fittings with bores 44, 46, respectively. The various bores and grooves just described in journal member 32 are referred to herein collectively as fluid passage means in the member.

Journal member 32 provides a rotational axis 33 in the assembly.

Line connector 34 is a unitary part formed as by casting to have the configuration illustrated in FIGS. 2 and 3. The line connector includes a central generally cylindrical hub 34a from which radiates an elongated neck 34b that joins with a head, or line-attaching means, 34c. Also included is a generally radially and partially circumferentially extending flange 34d which joins both with hub 34a and with neck 34b.

The line connector is rotatably mounted on portion 32a of journal member 32, and is captured thereon between an axially facing shoulder 56 (on portion 32b) and a snap ring 58 mounted on portion 32a. Formed inside hub 34a are axially spaced circumferentially extending grooves 60, 62 which confront and communicate with grooves 52, 54, respectively, in journal member 32. Grooves 60, 62 communicate through generally radially extending spaced-apart bores 64, 66, respectively, which are formed in neck 34b, with threaded bores, or ports, also referred to as attaching devices, 68, 70, respectively, which are formed in head 34c. Bores 68, 70 are spaced axially on the hub from each other. These bores and grooves in the line connector constitute fluid passage means therein. The outer ends of bores 64, 66 are closed off by plugs, such as plug 71 shown in FIG. 2.

The inner ends of hoses 23, 25 are connected through suitable fittings with bores 68, 70, respectively in head 34c.

Three O-ring type seals 72, 74, 76 are provided between the journal member and line connector. Seals 72, 74 seal the axially opposite sides of grooves 52, 60, and seals 74, 76 seal the axially opposite sides of grooves 54, 62.

Reel 36 comprises three parts herein, including two axially confronting generally circular end sections 36a, 36b which are joined through, and slightly separated by, a central circular divider 78. The two end sections in the reel have substantially mirror-image configurations—each comprising a unitary structure including a central web 80 which joins through an annular, axially extending wall, or wall portion, 82 with an outwardly radiating rim 84. The outside diameters of rims 84 and divider 78 are substantially the same.

According to the invention, the webs in sections 36a, 36b, and the central portion of divider 78, are provided with matching central openings which define a central clearance space, indicated generally at 86, which accommodates the hub, neck and head in line connector 34. As can be seen clearly in FIG. 3, clearance space 86 occupies a generally radially disposed central planar region lying in a plane 87 which intersects the line connector. Bores 68, 70 are disposed toward opposite sides of this plane. By virtue of the presence of these matching or aligned openings, good axial access is provided for the head in the line connector.

Wall portions 82, together with rims 84, and the outer circumferential margin of divider 78, define a pair of outwardly facing annular line-receiving channels 92, 94 for receiving inner end portions of hoses 23, 25, respectively. Provided in walls 82 are axially aligned arcuate slots or openings, such as the one shown partially at 96 in FIG. 2, through which the inner ends of hoses 23, 25 may be extended for attachment to the head of the line connector. The manner in which the inner ends of these hoses extend to connect with head 34c is illustrated clearly in FIG. 2.

A pair of freely rockable arcuate guides, such as guide 98 shown in FIGS. 2 and 6, are mounted on a common hinge pin 100 in axially matching positions adjacent openings 96 for the purpose of guiding the hoses through these openings. Guides 98 have convex outer line-guiding surfaces 98a (when viewed as seen in FIG. 2) over which a line may extend, with such preventing damaging sharp bends from developing in the inner ends of the hoses. And, because they can rock to different angular positions, the guides readily adjust to different sizes and types of hoses. As a consequence of this construction, and as can be seen in FIG. 2 for hose 25, the hose curves smoothly from its point of attachment with head 34c through opening 96 into channel 94.

The reel parts are secured together by inner and outer sets of three nut and bolt assemblies 88, 90, respectively. Assemblies 88 in addition, and in accordance with a feature of the invention, fasten the three reel parts to flange 34d in the line connector. As a consequence, the reel and line connector turn as a unit in assembly 26.

Spring assembly 38 includes a housing 102, and a coil spring 104 disposed within this housing. The housing includes outer and inner parts 102a, 102b, respectively, which substantially completely encase the spring. A central opening 103 in inner part 102b provides clearance for end portion 32a in the journal member to extend into the housing. The spring assembly is secured to the outside of reel section 36a by nut and bolt assemblies, such as assembly 106.

Spring 104 is formed from an elongated ribbon of a suitable spring material, such as spring steel, and has its outer end anchored to the outer part of housing 102 by a rivet 108. Referring to FIGS. 3, 4 and 5 together, the inner end of spring 104 is provided with an opening 110 shaped as indicated in FIG. 5. This opening receives a projecting portion of a generally cylindrical catch 112 which seats in a radially outwardly facing cylindrical socket 114 provided in end portion 32a of journal member 32. The catch is retained in place on the journal member by means of a conventional snap ring, or band, 116 which fits in an annular channel 117 defined by circumferentially aligned grooves formed both in the journal member and in the outer end portion of catch 122. As can be seen particulary in FIG. 4, the outer portion of the catch is formed with a notch 112a which catchs an edge of opening 110. The catch is also provided with an inclined cam surface 112b.

As can be seen in FIG. 4, the inner end of spring 104 has a smoothly curving, nonangular configuration which extends substantially tangentially along and adjacent the outside surface of the journal member portion 32a. Under normal circumstances in truck 10, spring 104 is tensed, and tends to urge rotation of the reel and line connector on the journal member generally in the direction of arrow 118 (shown in FIGS. 1, 2 and 4).

With the take-up assembly constructed as just described, all of the advantages ascribed to it earlier are attained. To begin with, it is apparent that the assembly is relatively simple in construction, and can easily be made to handle various kinds and sizes of flexible line. Contributing significantly to simplicity in the assembly is the fact that journal member 32 and line connector 34 are constructed to perform together as a rotary fluid coupling in the assembly, with the line connector including an outwardly radiating support flange 34 for mounting the reel parts. With the parts in the reel containing aligned central openings which expose the neck and head in the line connector, good axial access is provided for connecting and disconnecting an end of a line. Most importantly, such access is gained for both hose connecting points in the assembly without the need for removing any parts in the assembly.

If it is desired to gain access to the seals for checking, replacement, or other purposes, this can be accomplished simply by undoing fasteners 88 which releases the reel from the line connector, and by then removing snap ring 58 to permit removal of the line connector from the journal member. The inner end attachment provided between the inner end of spring 104 and the journal member readily allows such removal of the reel and spring assembly after undoing fasteners 88.

Because of the novel manner in which the spring's inner end attaches releasably to the journal member, spring life is greatly enhanced over that characterizing prior known similar spring assemblies. To begin with, no sharp angular bends are required for attachment purposes adjacent the inner end of the spring, which bends often produce failure points in springs. Under ordinary circumstances the spring's inner end remains caught by catch 112, but because of the inclusion of cam surface 112b in the catch, the spring end can release during a backwinding situation which might otherwise result in severe spring damage. The portion of catch 112 which projects through the opening in the spring end has a relatively low profile, whereby the spring's inner end can wrap relatively tightly around the journal member with little fear of kinking.

While an embodiment of the invention has been described herein, it is appreciated that variations and modifications may be made without departing from the spirit of the invention.

It is claimed and desired to secure by letters patent:

1. In a take-up assembly for flexible line, the combination comprising
    a journal member,
    a line connector, including a hub and line-attaching means, mounted for rotation on said journal member, said line-attaching means comprising a pair of line-attaching devices spaced axially on said hub, and
    line-storing means for collecting and storing line in windings mounted on said line connector for rotation as a unit therewith, said line-storing means being secured to said hub in a region intermediate said axially spaced attaching devices, and having a configuration exposing said line-attaching means for access in a direction extending axially of the hub.

2. The combination of claim 1, wherein said line connector further includes an outwardly radiating flange on said hub, and said line-storing means includes means fastened to said flange.

3. The combination of claim 2, wherein said means fastened to said flange includes an opening providing said access.

4. The combination of claim 3, wherein said means fastened to said flange comprises a disc-shaped divider occupying a plane substantially normal to the rotational axis provided said line connector, and said plane extends between said axially spaced attaching devices.

5. The combination of claim 2, wherein said line-storing means further includes means joined to said means fastened to said flange defining a generally annular line-receiving channel disposed radially outwardly of said line connector.

6. The combination of claim 5, wherein said means defining said line-receiving channel includes an opening enabling a line to extend from said channel to said line-attaching means.

7. The combination of claim 1, wherein said line connector further includes an outwardly radiating flange, and said line-storing means comprises a pair of axially confronting mirror-image sections disposed in matching relation in said assembly, each section including a central radially disposed web fastened to said flange, a generally cylindrical wall portion joined to and projecting axially toward one side of said web radially outwardly of said line connector, and a rim joined to and radiating from said wall portion and spaced axially from said web.

8. The combination of claim 7, wherein the webs in said sections are disposed in closely spaced substantially parallel planar relation, and include matching confronting openings in which is disposed said line-attaching means.

9. The combination of claim 8, which further includes a substantially planar generally circular divider disposed between said sections and including an opening substantially matching the openings in said webs, said divider further including a circumferential marginal portion radiating beyond said wall portions, and together with said wall portions and said rims defining a pair of line-receiving channels in said assembly.

10. In a take-up assembly for flexible hose, the combination comprising
   a journal member including fluid passage means,
   a hose connector, also including fluid passage means, mounted for rotation on said journal member, and further including hose-attaching means adapted for attachment to an end of a hose and an outwardly radiating flange,
   the passage means in said journal member and in said hose connector communicating with each other, whereby the journal member and hose connector together form a rotary fluid coupling in the assembly through which fluid may be supplied to and exhausted from a hose attached to said hose-attaching means, and
   hose-storing means including means defining a generally annular hose-receiving channel disposed radially outwardly of said hose connector for collecting hose in windings, and means fastened to said flange by which the hose-storing means is mounted on said flange for rotation as a unit therewith, with openings formed therein exposing said hose-attaching means for both generally axial and radial access thereto in said assembly.

11. The combination of claim 10, wherein said means fastened to said flange occupies a generally planar region in said assembly which is disposed substantially normal to the rotational axis provided said hose connector, and said hose-attaching means includes a pair of ports disposed on axially opposite sides of said region.

12. In a take-up assembly for flexible line, where such assembly includes a journal member, and a reel mounted thereon for rotation, the combination in operative condition comprising
   an elongated coil spring adapted to act between said journal member and said reel to urge unidirectional rotation of the latter on the former, said spring having a nonangular inner end including an opening, and
   a catch joined to said journal member and extending through said opening, said catch releasably catching said inner end, with such end extending adjacent and generally tangentially with respect to said journal member,
   said catch including a notch to prevent escape therefrom of said inner end with movement in parts in the assembly tending to produce relative tangential movement in one direction between said inner end and said journal member, and further including a cam surface to permit such escape with movement in parts in the assembly tending to produce relative tangential movement in the opposite direction between said inner end and said journal member.

13. The combination of claim 12, wherein said catch is removably secured to said journal member by a removable band which engages both the cath and the journal member.

14. The combination of claim 13, wherein said journal member and said catch each includes a groove, and said grooves together define a generally annular channel extending about the axis of said journal member, which channel receives said band.

15. In a take-up assembly for flexible line, the combination comprising
   a journal member,
   a line connector including line-attaching means mounted for rotation on said journal member,
   line-storing means for collecting and storing line in windings anchored to said line connector for rotation as a unit therewith, including means defining a generally annualar line-receiving channel disposed radially outwardly of said line connector and having an opening enabling a line to extend from said line-attaching means to said channel, and
   a line guide adjacent said opening, and including a line-guiding surface located radially inwardly of said line-receiving channel, over which a line may be trained in a smoothly curving, non-angular manner where such line extends from the line-attaching means to the channel, said guide being pivotally mounted for limited rocking about an axis substantially paralleling the axis about which the line-storing means and line connector are rotatable.

16. The combination of claim 15, wherein said line-guiding surface is convex.

* * * * *